(12) United States Patent
Swarts et al.

(10) Patent No.: US 8,917,704 B2
(45) Date of Patent: Dec. 23, 2014

(54) METHOD AND SYSTEM FOR AUTOMATICALLY RESCALING AN ACCUMULATION BUFFER IN SYNCHRONIZATION SYSTEMS

(75) Inventors: Francis Swarts, San Diego, CA (US); Mark Kent, Vista, CA (US)

(73) Assignee: Broadcom Corporation, Irvine, CA (US)

( * ) Notice: Subject to any disclaimer, the term of this patent is extended or adjusted under 35 U.S.C. 154(b) by 1204 days.

(21) Appl. No.: 12/768,415

(22) Filed: Apr. 27, 2010

(65) Prior Publication Data

US 2011/0243105 A1    Oct. 6, 2011

Related U.S. Application Data

(60) Provisional application No. 61/321,402, filed on Apr. 6, 2010.

(51) Int. Cl.

| | |
|---|---|
| H04J 3/00 | (2006.01) |
| H04L 27/26 | (2006.01) |
| H04L 7/04 | (2006.01) |
| H04L 5/00 | (2006.01) |

(52) U.S. Cl.
CPC .............. *H04L 7/042* (2013.01); *H04L 5/0048* (2013.01); *H04L 27/2662* (2013.01); *H04L 27/2668* (2013.01)
USPC ....................................................... 370/336

(58) Field of Classification Search
CPC ............ H04L 27/2662; H04L 27/2663; H04L 27/2671
USPC ....................................................... 370/336
See application file for complete search history.

(56) References Cited

U.S. PATENT DOCUMENTS

| | | | |
|---|---|---|---|
| 5,023,940 A | 6/1991 | Johnson et al. | |
| 6,721,797 B1 | 4/2004 | Kim | |

(Continued)

FOREIGN PATENT DOCUMENTS

| | | |
|---|---|---|
| CN | 1346182 A | 4/2002 |
| CN | 101420267 A | 4/2009 |

(Continued)

OTHER PUBLICATIONS

Qualcomm Europe, "Further analysis of initial cell search for Approach 1 and 2—multi-cell scenario," 3rd Generation Partnership Project (3GPP) Draft, Sorrento, Italy, Jan. 2007.

*Primary Examiner* — Mark Rinehart
*Assistant Examiner* — Matthew Hopkins
(74) *Attorney, Agent, or Firm* — Sterne, Kessler, Goldstein & Fox P.L.L.C.

(57) ABSTRACT

A mobile device accumulates energy associated with each of successive PSS transmissions received from a base station. Accumulated energy values may be rescaled by a same number of bits whenever a buffer overflow condition occurs within the accumulation buffer. The mobile device may detect a correct PSS timing hypothesis utilizing the rescaled accumulated energy values within the accumulation buffer. A significant bit such as, for example, the most significant bit (MSB) or one of lesser significant bits, of each of the accumulated energy values may be monitored during the energy accumulation process to detect a buffer overflow condition. The mobile device may determine number of bits for rescaling or right shift each of the accumulated energy values in response to the detected buffer overflow condition. The resulting shifted accumulated energy values may be utilized for PSS detection. Either an integrating or filtering method is utilized during the energy accumulation process.

24 Claims, 7 Drawing Sheets

(56) References Cited

U.S. PATENT DOCUMENTS

| | | |
|---|---|---|
| 7,436,878 B1 | 10/2008 | Harris et al. |
| 7,835,327 B2 | 11/2010 | Hahm et al. |
| 7,894,404 B2 | 2/2011 | Hahm et al. |
| 8,059,767 B2 | 11/2011 | Furman et al. |
| 8,326,251 B2 | 12/2012 | Swarts et al. |
| 8,369,279 B2 | 2/2013 | Swarts et al. |
| 8,380,151 B2 | 2/2013 | Swarts et al. |
| 8,401,123 B2 | 3/2013 | Swarts et al. |
| 8,462,647 B2 | 6/2013 | Swarts et al. |
| 8,576,830 B2 | 11/2013 | Swarts et al. |
| 8,649,752 B2 | 2/2014 | Swarts et al. |
| 2001/0043641 A1 | 11/2001 | Harms et al. |
| 2002/0054624 A1 | 5/2002 | Boloorian |
| 2003/0012268 A1 | 1/2003 | Doetsch et al. |
| 2003/0099206 A1 | 5/2003 | Jones et al. |
| 2003/0147365 A1* | 8/2003 | Terasawa et al. ............. 370/335 |
| 2004/0062298 A1 | 4/2004 | McDonough et al. |
| 2004/0120252 A1 | 6/2004 | Bowen, Jr. et al. |
| 2004/0156422 A1 | 8/2004 | Liljestrom |
| 2005/0238087 A1 | 10/2005 | Yang et al. |
| 2007/0218854 A1 | 9/2007 | Lawrence et al. |
| 2008/0019350 A1 | 1/2008 | Onggosanusi et al. |
| 2008/0080463 A1 | 4/2008 | Stewart et al. |
| 2008/0090600 A1 | 4/2008 | Demir et al. |
| 2009/0017768 A1 | 1/2009 | Makarov |
| 2009/0034501 A1 | 2/2009 | Hahm et al. |
| 2009/0034589 A1 | 2/2009 | Hahm et al. |
| 2009/0041162 A1 | 2/2009 | Li et al. |
| 2009/0046671 A1* | 2/2009 | Luo ............................. 370/336 |
| 2009/0086713 A1 | 4/2009 | Luo |
| 2009/0219883 A1 | 9/2009 | Cho et al. |
| 2010/0041338 A1 | 2/2010 | Hannagan |
| 2010/0098031 A1 | 4/2010 | Charbit |
| 2010/0128824 A1 | 5/2010 | Hui |
| 2010/0158079 A1 | 6/2010 | Li et al. |
| 2010/0182979 A1 | 7/2010 | Malladi et al. |
| 2011/0026413 A1 | 2/2011 | Swarts et al. |
| 2011/0026648 A1 | 2/2011 | Swarts et al. |
| 2011/0026649 A1 | 2/2011 | Lipka et al. |
| 2011/0151817 A1 | 6/2011 | Swarts et al. |
| 2011/0223901 A1 | 9/2011 | Swarts et al. |
| 2011/0237214 A1 | 9/2011 | Swarts et al. |
| 2011/0243104 A1 | 10/2011 | Swarts et al. |
| 2013/0142165 A1 | 6/2013 | Swarts et al. |
| 2013/0157602 A1 | 6/2013 | Swarts et al. |
| 2013/0176941 A1 | 7/2013 | Swarts et al. |

FOREIGN PATENT DOCUMENTS

| | | |
|---|---|---|
| CN | 101986745 A | 3/2011 |
| EP | 1 677 429 A1 | 7/2006 |
| EP | 2 020 756 A2 | 2/2009 |

* cited by examiner

METHOD AND SYSTEM FOR AUTOMATICALLY RESCALING AN ACCUMULATION BUFFER IN SYNCHRONIZATION SYSTEMS

CROSS-REFERENCE TO RELATED APPLICATIONS/INCORPORATION BY REFERENCE

This patent application makes reference to, claims priority to and claims the benefit from U.S. Provisional Patent Application Ser. No. 61/321,402 filed on Apr. 6, 2010.

This application makes reference to:
U.S. Application Ser. No. 61/288,053 filed on Dec. 18, 2009,
U.S. application Ser. No. 12/721,979 filed on Mar. 11, 2010,
U.S. Application Ser. No. 61/312,555 filed on Mar. 10, 2010,
U.S. application Ser. No. 12/732,052 filed on Mar. 25, 2010,
U.S. Application Ser. No. 61/318,660 filed on Mar. 29, 2010,
U.S. application Ser. No. 12/766,752 filed on Apr. 23, 2010,
U.S. Application Ser. No. 61/320,371 filed on Apr. 2, 2010,
U.S. application Ser. No. 12/768,379 filed on Apr. 27, 2010, and
U.S. application Ser. No. 12/721,979 filed on Mar. 11, 2010.

Each of the above stated applications is hereby incorporated herein by reference in its entirety.

FIELD OF THE INVENTION

Certain embodiments of the invention relate to communication systems. More specifically, certain embodiments of the invention relate to a method and system for automatically rescaling an accumulation buffer in synchronization systems.

BACKGROUND OF THE INVENTION

Various communication standards such as Evolved Universal Terrestrial Radio Access (E-UTRA), also called Long Term Evolution (LTE), have been developed to offer comparatively high data rates to support high quality services. LTE is a Third Generation Partnership Project (3GPP) standard that provides for an uplink speed of up to 50 megabits per second (Mbps) and a downlink speed of up to 100 Mbps. The LTE/E-UTRA standard represents a major advance in cellular technology. The LTE/E-UTRA standard is designed to meet current and future carrier needs for high-speed data and media transport as well as high-capacity voice support. The LTE/E-UTRA standard brings many technical benefits to cellular networks, some of which include the benefits provided by Orthogonal Frequency Division Multiplexing (OFDM) and/or Multiple Input Multiple Output (MIMO) data communication. In addition, Orthogonal Frequency Division Multiple Access (OFDMA) and Single Carrier—Frequency Division Multiple Access (SC-FDMA) are used on the downlink (DL) and on the uplink (UL), respectively.

Mobility management represents an important aspect of the LTE/E-UTRA standard. As a mobile device, also called user equipment (UE) in the LTE/E-UTRA standard, moves within an LTE/E-UTRA coverage area, the use of synchronization signal transmissions and cell search procedures provide a basis for the mobile device or UE to detect and synchronize with individual cells. To communicate with a particular cell, mobile devices in associated LTE/E-UTRA coverage areas need to determine one or more cell specific transmission parameters such as, for example, symbol timing, radio frame timing, and/or a cell ID. In the LTE/E-UTRA standard, the cell-specific information is carried by reference, broadcast, and/or synchronization signals. The latter forms the basis for downlink (DL) synchronization and cell specific information identification at the mobile devices within the associated LTE/E-UTRA coverage area. Two downlink (DL) synchronization signals, namely Primary Synchronization Signal (PSS) and Secondary Synchronization Signal (SSS), are used to allow the mobile devices to synchronize to transmission timing of the particular cell, and thereby obtain cell specific information such as full physical Cell ID, and/or a Cell ID group indicator.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A method and/or system for automatically rescaling an accumulation buffer in synchronization systems, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for automatically rescaling an accumulation buffer in synchronization systems. A mobile device is operable to receive successive primary synchronization signal (PSS) and secondary synchronization signal (SSS) transmissions from a base station. The received PSS and SSS transmissions may be used by the mobile device to acquire PSS synchronization. Energy associated with each of the received PSS transmissions is accumulated in an accumulation buffer within the mobile device. Each of accumulated energy values may be rescaled by a same number of bits whenever a buffer overflow condition occurs within the accumulation buffer. The mobile device may be operable to detect a correct PSS timing hypothesis utilizing the rescaled accumulated energy values within the accumulation buffer. A significant bit such as, for example, the most significant bit (MSB) or one of lesser significant bits, of each of the accumulated energy values may be monitored or observed during the energy accumulation process. The occurrence of a buffer overflow condition may be identified or detected based on the corresponding monitored significant bit and the actual configuration of the accumulation buffer. In instances where a buffer overflow condition occurs, the mobile device may be operable to determine a number of bits to be utilized for rescaling or right shifting each of the accumulated energy values in the accumulation buffer. The resulting right shifted accumulated energy values may be utilized for PSS detection. Depending on system configuration, various accumulation approaches such as, for example, integrating or filtering methods, may be utilized during the energy accumulation process.

Figure 1:
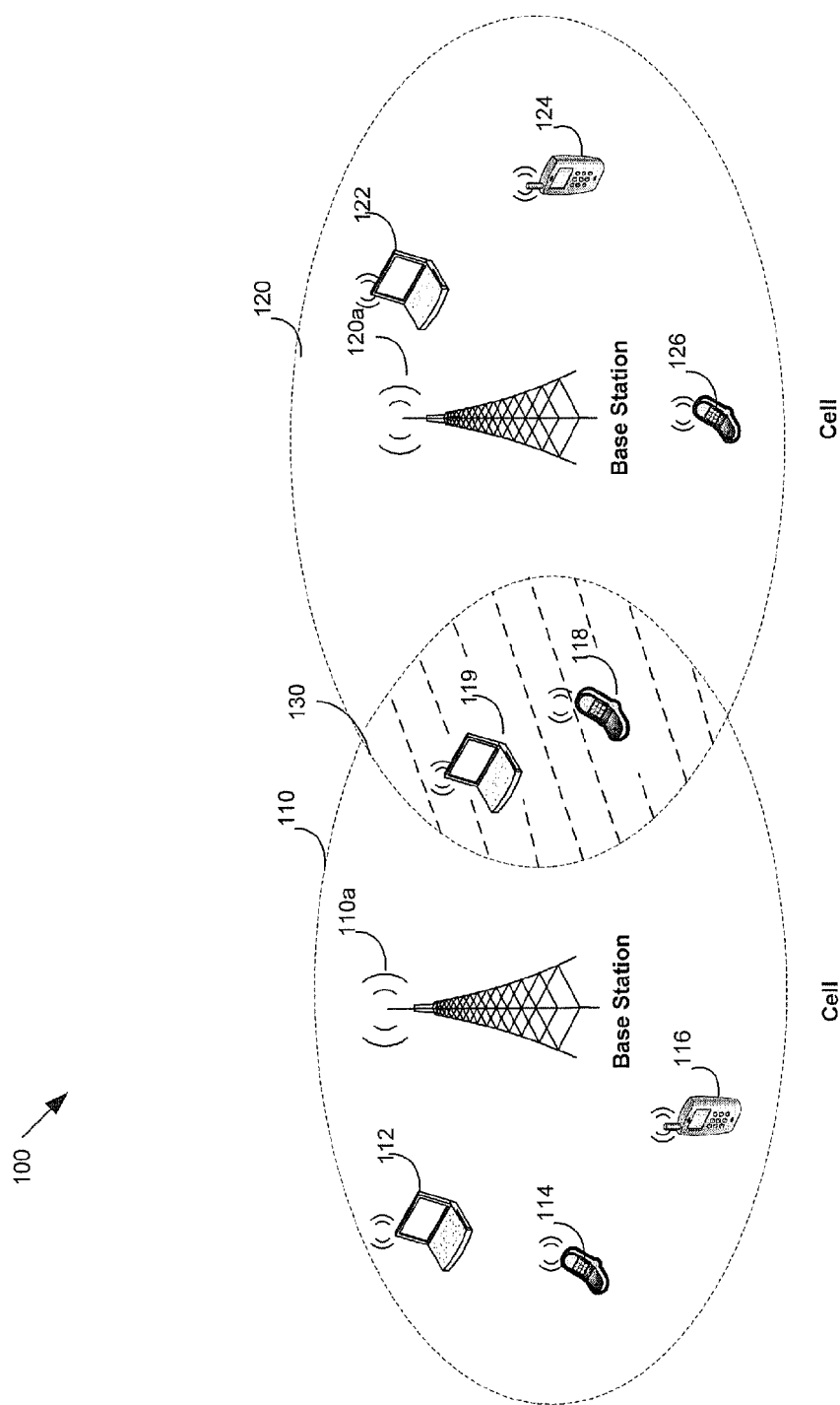
FIG. 1 is a diagram illustrating an exemplary wireless communication system that is operable to automatically rescale an accumulation buffer for acquisition of slot timing, in accordance with an embodiment of the invention.

FIG. 1 is a diagram illustrating an exemplary wireless communication system that is operable to automatically rescale an accumulation buffer for acquisition of slot timing, in accordance with an embodiment of the invention. Referring to FIG. 1, there is shown a wireless communication system 100. The wireless communication system 100 comprises a plurality of cells, of which cells 110-120 are displayed. A coverage area 130 is the overlapped coverage area of the cell 110 and the cell 120. The cell 110 and the cell 120 are geographic areas served by a base station 110a and a base station 120a, respectively. The wireless communication system 100 comprises a plurality of mobile devices, of which mobile devices 110-126 are illustrated. The mobile devices 112-116 are shown located in the cell 110. The mobile devices 122-126 are shown located in the cell 120. The mobile device 118 and the mobile device 119 are shown located in the overlapped coverage area 130.

A base station such as the base station 110a may comprise suitable logic, circuitry, interfaces and/or code that are operable to manage various aspects of communication, for example, communication connection establishment, connection maintenance and/or connection termination, with associated mobile devices within the cell 110. The base station 110a may be operable to manage associated radio resources such as, for example, radio bearer control, radio admission control, connection mobility control, and/or dynamic allocation of radio resources within the cell 110 in both uplink and downlink communication. The base station 110a may be operable to utilize physical channels and physical signals for communications in both the uplink and the downlink communication. The physical channels may carry information from higher layers to communicate user data as well as user control information. The physical signals such as reference signals and synchronization signals may not carry information from higher layers. Reference signals from the base station 110a may be utilized by mobile devices in the cell 110 to determine channel impulse responses (CIRs). A specified reference signal is assigned to each cell within a network and acts as a cell-specific identifier. Synchronization signals may comprise primary secondary synchronization signals (PSS) and secondary synchronization signals (SSS). For example, in E-UTRA/LTE, the base station 110a may be operable to repeatedly transmit the PSS and the SSS in every repetition interval, for example, 5 ms, in the last two OFDM symbols of the first and eleventh slot in each radio frame. The PSS is chosen from a variety of Zadhoff-Chu sequences, carrying the information of the identity of the base station or cell within a cell group. The SSS is a sequence carrying the information about the cell group, encoded with a scrambling sequence, which is unique to an associated mobile device. The scrambling code may be linked or mapped to, for example, the index of the PSS. After successful time and frequency synchronization via the PSS synchronization, the frame boundary synchronization and/or the cell identification may be performed via SSS detection. The transmission of the PSS and the SSS may allow timing and frequency offset issues to be resolved before cell-specific information may be determined. This may reduce complexity in initial cell search and/or handover modes for associated mobile devices such as the mobile device 114 and the mobile device 118.

A mobile device such as the mobile device 118 may comprise suitable logic, circuitry, interfaces and/or code that may be operable to communicate with a base station such as the base station 110a for services supported, for example, in the LTE/E-UTRA standard. To communicate with the base station 110a, the mobile device 118 may be operable to determine one or more transmission parameters used by base station 110a. Such information may be obtained by, for example, decoding a Broadcast Channel (BCH) signal from the base station 110a. To that end, the mobile device 118 may need to synchronize to corresponding symbol timing and frame timing of transmissions from the base station 110a so as to acquire cell-specific parameters such as, for example, associated cell ID and/or antenna configuration. In this regard, the mobile device 118 may be operable to receive a plurality of PSSs and SSSs every 5 ms from neighbor or surrounding base stations such as the base station 110a and the base station 120a. The received plurality of PSSs is base station or cell specific.

The mobile device 118 may be operable to detect or select a particular PSS from the received plurality of PSSs to acquire PSS synchronization. The detected PSS may be used to estimate a channel. The resulting channel estimates may be utilized to decode or detect the associated SSS for frame boundary synchronization and cell group information identification. Various methods may be used by the mobile device 118 to detect or select the particular PSS out of the received plurality of PSSs. For example, the mobile device 118 may be operable to generate a plurality of correlation reference sequences (reference PSSs) each to correlate or match with the received plurality of PSSs, respectively. PSS correlation data may be buffered and processed in a PSS timing hypothesis buffer associated with the mobile device 118. A PSS timing hypothesis buffer is an accumulation buffer coupled to a corresponding mobile device such as the mobile device 118.

The PSS timing hypothesis buffer may comprise possible PSS timing hypotheses over one or more repetition intervals of the PSS transmissions. The PSS timing hypotheses in the PSS timing hypothesis buffer may correspond to corresponding successive PSS retransmissions from, for example, the base station 110a. Depending on a sampling frequency utilized at the mobile device 118 and repetition intervals of the PSS transmissions, the number of PSS timing hypotheses may vary within the PSS timing hypothesis buffer. For example, in E-UTRA/LTE, the PSS timing hypothesis buffer may comprise 4,800 or 9,600 PSS timing hypotheses per half frame. Each of the PSS timing hypotheses may have an equal likelihood of being selected as a correct PSS timing hypothesis at which a desired PSS is signaled. In this regard, the mobile device 118 may be operable to investigate each PSS timing hypothesis within the PSS timing hypothesis buffer given a certain elapsed time period such as, for example, multiple repetition intervals of the PSS transmissions. The correct PSS timing hypothesis and associated slot boundary may be determined based on the maximum accumulated energy associated with the PSS transmissions over the entire set of PSS timing hypotheses. In this regard, the mobile device 118 may be operable to calculate accumulated energy associated with the PSS transmissions for each PSS timing hypothesis utilizing various accumulation approaches such as, for example, integrating or filtering methods.

A growth-rate for resulting accumulated energy values may vary depending on an employed accumulation approach. The maximum accumulated energy values corresponding to each PSS timing hypothesis may be saturated or overflowed depending on the setup of the PSS timing hypothesis buffer. In this regard, the mobile device 118 may be configured to monitor the most significant bit (MSB) or one of the lesser significant bits of the accumulated energy values for each PSS timing hypothesis during the energy accumulation processes. In instances where a MSB of an accumulated energy value associated with a particular PSS timing hypothesis is under risk of saturating or overflowing the PSS timing hypothesis buffer, the mobile device 118 may be configured to rescale the whole contents of the PSS timing hypothesis buffer by the same number of bits. For example, the mobile device 118 may right shift each of the accumulated energy values in the PSS timing hypothesis buffer by a same pre-determined number of bits. The mobile device 118 may be operable to maintain the relative scaling among the PSS timing hypotheses in the PSS timing hypothesis buffer. In this regard, the mobile device 118 may be allowed to perform the energy accumulation process for an arbitrary length of time without sacrificing integration length and/or PSS detection sensitivity. The resulting rescaled accumulated energy values may be utilized for PSS detection. The correct PSS timing hypothesis and associated slot boundary may be detected without adversely affecting buffer contents due to clipping or overflow. The mobile device 118 may be operable to utilize the detected correct PSS timing hypothesis and associated slot to start camping on a corresponding cell such as the cell 110.

In an exemplary operation, the base station 110a may be operable to perform communications within the cell 110 using physical channels and physical signals such as a PSS and a SSS. The base station 110a may be operable to transmit base station specific PSS and SSS, periodically, for example, every 5 ms. To communicate with the base station 110a, a mobile device such as the mobile device 118 may acquire the PSS and SSS transmitted from the base station 110a so as to determine one or more transmission parameters utilized by the base station 110a. For example, the mobile device 118 may be operable to acquire PSS synchronization to identify the PSS timing. In this regard, the mobile device 118 may be operable to generate a set of PSS timing hypotheses, namely, reference PSSs, each to correlate or match with signals from the base station 110a. The mobile device 118 may be operable to buffer resulting PSS correlation data in an associated accumulation buffer, namely, a PSS timing hypothesis buffer, for a correct PSS timing hypothesis and associated slot boundary. Energy associated with the PSS transmissions may be accumulated, with respect to each PSS timing hypothesis, over one or more repetition intervals of the PSS transmissions. The mobile device 118 may determine the correct PSS timing hypothesis and associated slot boundary based on the maximum accumulated energy associated with the PSS transmissions. To avoid a buffer overflow, the mobile device 118 may be operable to continually monitor or observe the MSB or one of the lesser significant bits of each of the accumulated energy values during the energy accumulation processes. In instances where a buffer overflow condition occurs, the whole contents of the PSS timing hypothesis buffer may be re-scaled by a same number of bits. More specifically, each of the accumulated energy values in the PSS timing hypothesis buffer may be right shifted by a pre-determined number of bits. The correct PSS timing hypothesis and associated slot boundary may be detected based on the maximum rescaled accumulated energy value over the entire set of PSS timing hypotheses. The detected correct PSS timing hypothesis and associated slot boundary may be utilized by the mobile device 118 to communicate information while the mobile is within the cell 110.

Figure 2:
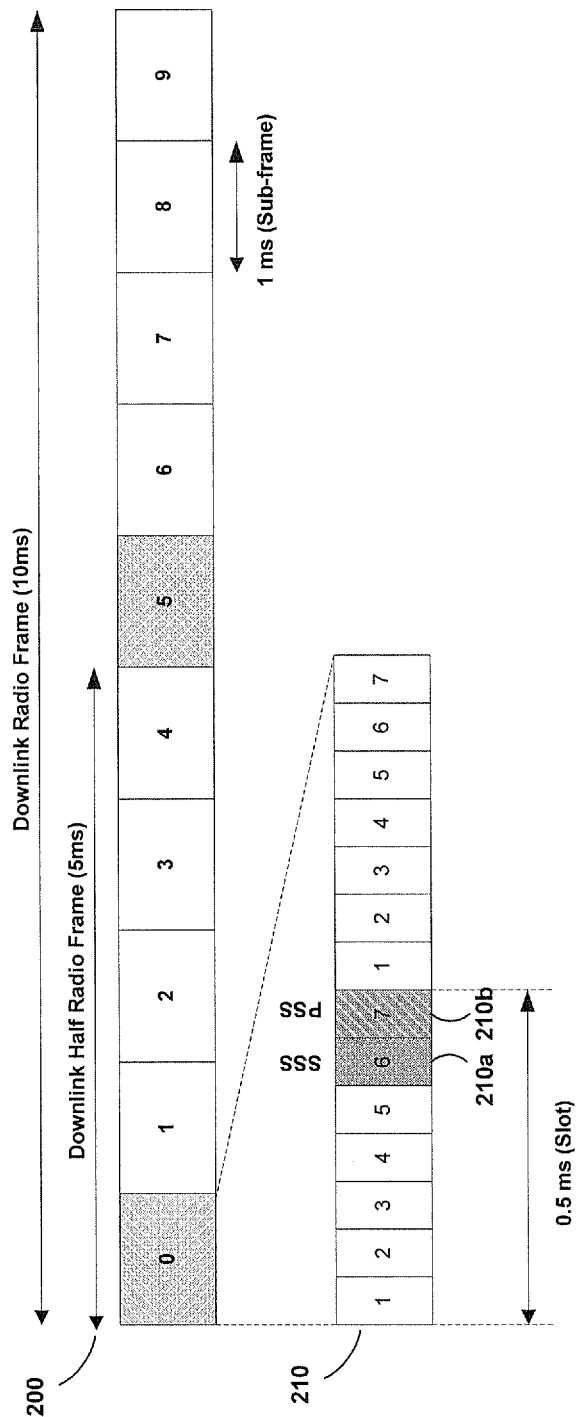
FIG. 2 is a block diagram of an exemplary downlink synchronization signal structure, which is utilized in accordance with an embodiment of the invention.

FIG. 2 is a block diagram of an exemplary downlink synchronization signal structure, which is utilized in accordance with an embodiment of the invention. Referring to FIG. 2, there is shown a downlink radio frame 200. In the LTE/E-UTRA standard, the downlink radio frame 200 may be divided into twenty equally sized slots with two contiguous slots arranged into a sub-frame such as the sub-frame 210. Downlink synchronization signals such as a PSS 210a and a SSS 210b may be transmitted from a base station such as, for example, the base station 110a and/or the base station 110b, to associated mobile devices such as the mobile device 118 so that the mobile device 118 may obtain correct timing for the downlink radio frame 200 and acquire cell-specific parameters such as, for example, associated Cell-ID and/or antenna configuration.

The PSS 210a and the SSS 210b may be transmitted on sub-frame 0 and 5 of the downlink radio frame 200 and occupy two consecutive symbols in a corresponding sub-frame. The PSS 210a may be used to identify the symbol timing and the Cell-ID within a cell ID group. The SSS 210b may be used for identifying frame boundary, detecting cell ID group, and/or acquiring system parameters such as cyclic prefix (CP) length. The SSS detection for the SSS 210b may start after a successful PSS synchronization on the PSS 210a. The PSS synchronization may provide timing and frequency offset information for the downlink radio frame 200. In this regard, a PSS correlation process may be performed with respect to the PSS 210a for a correct PSS timing hypothesis and frequency offset estimation. Energy associated with resulting PSS data may be accumulated in an accumulation buffer or a PSS timing hypothesis buffer. The MSB or one of the lesser significant bits of each of accumulated energy values may be observed during the energy accumulation processes. Each of the accumulated energy values may be rescaled by a same number of bits whenever a buffer overflow condition occurs. A signal may be generated to indicate when the buffer overflows. A correct PSS timing hypothesis for the PSS 210a may be detected based on the maximum rescaled accumulated energy value associated with the PSS 210a. The SSS 210b may be detected after the detection of the PSS 210a for cell-specific parameters such as, for example, Cell-ID and/or cyclic prefix (CP) length.

Figure 3:
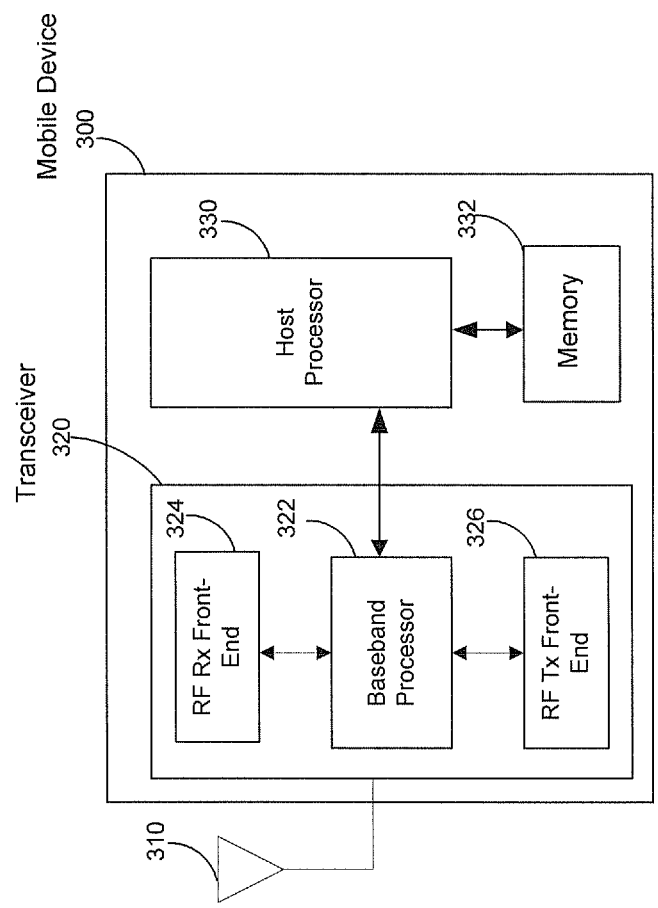
FIG. 3 is a block diagram of an exemplary mobile device that may be operable to automatically rescale a primary synchronization signal (PSS) timing hypothesis accumulation buffer for acquisition of slot timing, in accordance with an embodiment of the invention.

FIG. 3 is a block diagram of an exemplary mobile device that may be operable to automatically rescale a primary synchronization signal (PSS) timing hypothesis accumulation buffer for acquisition of slot timing, in accordance with an embodiment of the invention. Referring to FIG. 3, there is shown a mobile device 300 comprising an antenna 310, a transceiver 320, a host processor 330 and a memory 332. The transceiver 320 comprises a radio frequency (RF) receiver (Rx) front-end 324, a radio frequency (RF) transmitter (Tx) front-end 326 and a baseband processor 322.

The antenna 310 may comprise suitable logic, circuitry, interfaces and/or code that may be suitable for transmitting and/or receiving electromagnetic signals. Although a single antenna is illustrated, the invention is not so limited. In this regard, the transceiver 320 may be operable to utilize a common antenna for transmission and reception of radio frequency (RF) signals adhering to one or more wireless standards, may utilize different antennas for each supported wireless standard, and/or may utilize a plurality of antennas for each supported wireless standard. Various multi-antenna configurations may be utilized to take advantage of smart antenna technologies, diversity and/or beamforming, for example.

The transceiver 320 may comprise suitable logic, circuitry, interfaces and/or code that may be operable to transmit and/or receive RF signals adhering to one or more wireless standards such as the LTE/E-UTRA standard.

The RF Rx front-end 324 may comprise suitable logic, circuitry, interfaces and/or code that may be operable to process RF signals received, for example, over a LTE/E-UTRA air interface, via the antenna 310. The RF Rx front-end 324 may be operable to convert the received RF signals to corresponding baseband signals. The resulting baseband signals may be communicated with the baseband processor 322 for further baseband processing.

The RF Tx front-end 326 may comprise suitable logic, circuitry, interfaces and/or code that may be operable to process RF signals for transmission. The RF Tx front-end 326 may be operable to receive baseband signals from the baseband processor 128 and convert the baseband signals to corresponding RF signals for transmission via the antenna 310.

The baseband processor 322 may comprise suitable logic, circuitry, interfaces and/or code that may be operable to manage and/or control operations of the RF Rx front-end 324 and the RF Tx front-end 326, respectively. The baseband processor 322 may be operable to communicate baseband signals with the transceiver 320. The baseband processor 322 may be operable to handle baseband signals to be transferred to the RF Tx front-end 326 for transmission and/or process baseband signals from the RF Rx front-end 224. The received baseband signals may comprise successive PSS and SSS transmissions received from the base station 110a, for example. The received PSS and SSS transmissions may be utilized to acquire transmission timing and other cell-specific parameters such as, for example, associated cell ID and/or antenna configuration used in an associated cell. In this regard, the baseband processor 322 may be operable to generate a plurality of correlation reference sequences (reference PSSs or PSS timing hypotheses) each to correlate or match with the received PSS transmissions, respectively. The baseband processor 322 may buffer magnitudes of resulting PSS correlation data in an associated PSS timing hypothesis buffer. The PSS timing hypothesis buffer comprises possible PSS timing hypotheses over one or more repetition intervals of the successive PSS transmissions. Energy associated with the PSS transmissions may be accumulated for each PSS timing hypothesis utilizing various accumulation approaches such as, for example, integrating or filtering methods. To avoid a buffer overflow condition, the baseband processor 322 may be configured to monitor the MSB or one of the lesser significant bits of corresponding accumulated energy values during the energy accumulation processes. A buffer overflow condition may occur whenever the MSB or one of the lesser significant bits of an accumulated energy value is close to the maximum numerical range of the PSS timing hypothesis buffer. The baseband processor 322 may be operable to rescale the whole contents of the PSS timing hypothesis buffer by a same number of bits whenever a buffer overflow condition occurs. In this regard, the baseband processor 322 may right shift each of the accumulated energy values in the PSS timing hypothesis buffer by a pre-determined number of bits. The correct PSS timing hypothesis may be detected based on the maximum rescaled accumulated energy value within the PSS timing hypothesis buffer. The baseband processor 322 may be operable to utilize the detected correct PSS timing hypothesis for other baseband processes such as SSS detection.

The host processor 330 may comprise suitable logic, circuitry, interfaces and/or code that may be operable to manipulate and control operation of the transceiver 320. The host processor 330 may be operable to communicate data with the transceiver 320 to support applications such as, for example, audio streaming on the mobile device 300.

The memory 332 may comprise suitable logic, circuitry, and/or code that may enable storage of information such as executable instructions and data that may be utilized by the host processor 330 as well as the baseband processor 322. The executable instructions may comprise algorithms that may be applied to various baseband signal processes such as synchronization and/or channel estimation. The memory 332 may comprise RAM, ROM, low latency nonvolatile memory such as flash memory and/or other suitable electronic data storage.

In an exemplary operation, the RF Rx front-end 324 may be operable to process a RF signal received via the antenna 310 over the LTE/E-UTRA air interface, for example. The received RF signal may comprise successive PSS and SSS transmissions from base stations such as the base station 110a and the base station 120a. The received RF signal may be converted to a corresponding baseband signal and communicated to the baseband processor 322 for further baseband processing. To communicate with a particular base station such as the base station 110a, the baseband processor 322 may be operable to synchronize to cell specific transmission timing such as, for example, the symbol timing and frame boundary used by the base station 110a. In this regard, the baseband processor 322 may be operable to generate a plurality of reference PSSs for acquiring PSS synchronization with the base station 110a. The baseband processor 322 may be operable to correlate each of the generated reference PSSs with the baseband signal received from the RF Rx front-end 324. Magnitudes of resulting PSS correlation data may be buffered in an associated PSS timing hypothesis buffer.

The baseband processor 322 may be operable to accumulate energy for each PSS timing hypothesis utilizing, for example, integrating or filtering. The MSB or one of the lesser significant bits of corresponding accumulated energy values may be monitored during the energy accumulation processes to avoid a possible buffer overflow condition. The baseband processor 322 may rescale the whole contents of the PSS timing hypothesis buffer by a same number of bits whenever a buffer overflow condition occurs. The baseband processor 322 may be operable to right shift each of the accumulated energy values in the PSS timing hypothesis buffer by a determined number of bits. The number of bits may be predetermined or dynamically determined. The correct PSS timing hypothesis for the PSS transmissions from the base station 110a may be detected based on the maximum rescaled accumulated energy value within the PSS timing hypothesis buffer.

Figure 4:
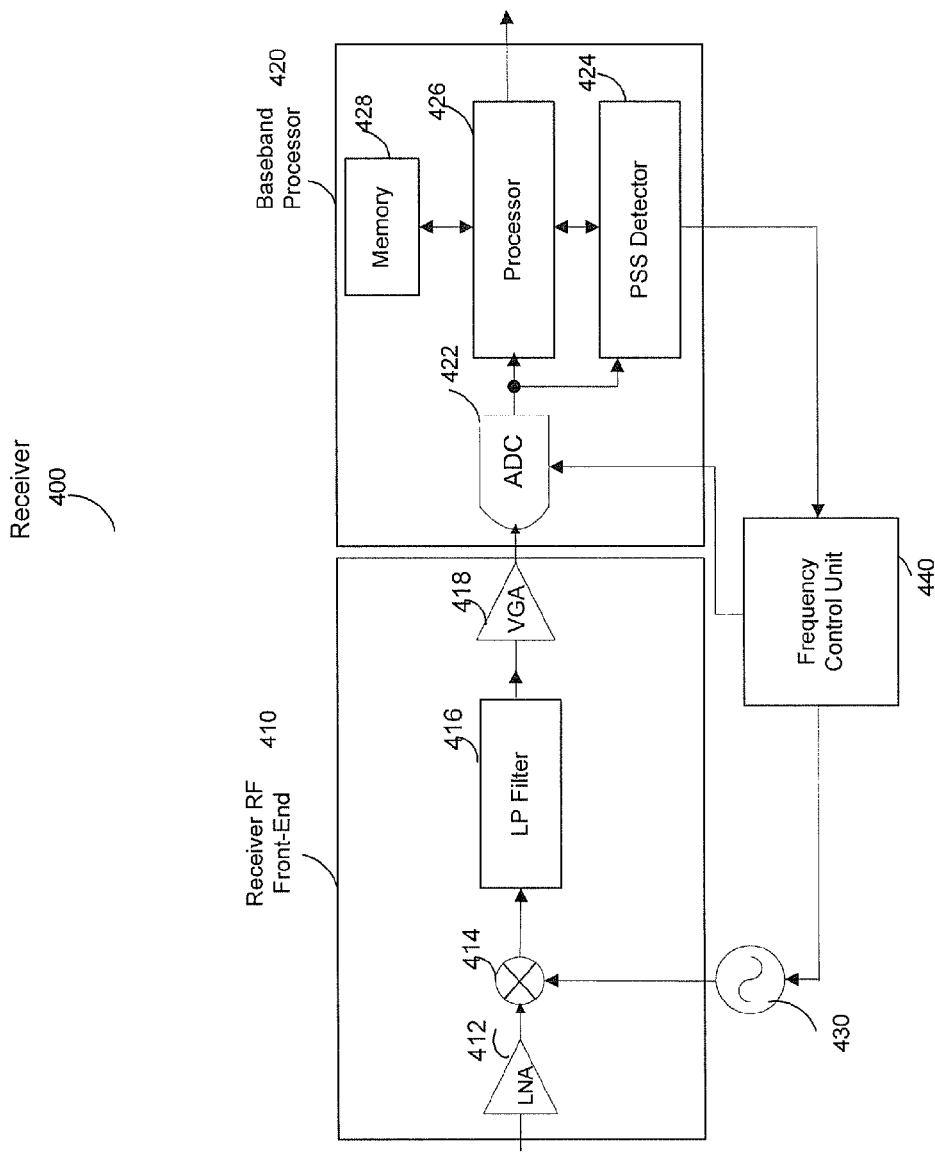
FIG. 4 is a block diagram illustrating an exemplary receiver that is operable to automatically rescale a primary synchronization signal (PSS) timing hypothesis accumulation buffer for acquisition of slot timing, in accordance with an embodiment of the invention.

FIG. 4 is a block diagram illustrating an exemplary receiver that is operable to automatically rescale a primary synchronization signal (PSS) timing hypothesis accumulation buffer for acquisition of slot timing, in accordance with an embodiment of the invention. Referring to FIG. 4, there is shown a receiver 400. The receiver 400 comprises a receiver radio frequency (RF) front-end 410, a baseband processor 420, a local oscillator 430 and a frequency control unit 440. The receiver RF front-end 410 comprises a low noise amplifier (LNA) 412, a mixer 414, a low pass (LP) filter 416, and a variable-gain amplifier (VGA) 418. The baseband processor 420 comprises an analog-to-digital converter (ADC) 422, a PSS detector 424, a processor 426 and a memory 428.

The receiver RF front-end 410 may comprise suitable logic, circuitry, interfaces and/or code that may be operable to process a RF signal received via the antenna 310. The received RF signal may comprise a PSS and a SSS. The receiver RF front-end 410 may be operable to convert the received RF signal to a corresponding baseband frequency, which may be further processed by the baseband processor 420.

The LNA 412 may comprise suitable logic, circuitry, interfaces and/or code that may be operable to amplify a RF signal received by the antenna 310. The LNA 412 may be operable to essentially set a limit for how low a system noise figure may reach. The LNA 412 may be enabled to achieve a low noise performance, which is crucial for a high performance radio frequency (RF) front end.

The mixer 414 may comprise suitable logic, circuitry, interfaces and/or code that may be operable to translate the amplified RF signal from the LNA 412 to a lower, intermediate frequency (IF) signal using signals provided by a local oscillator 430, which is driven by a reference frequency provided by the frequency control unit 440.

The LP filter 416 may comprise suitable logic, circuitry, interfaces and/or code that may be operable to filter the IF signal from the mixer 414 so as to remove unwanted signal components. The LP filter 416 may be operable to convert the resulting IF signal to an analog baseband signal.

The VGA 418 may comprise suitable logic, circuitry, interfaces and/or code that may be operable to amplify the analog baseband signal from the LP filter 416. The VGA 418 may be operable to apply different gains to the analog baseband signal resulting in a variable signal level at the input to the ADC 422.

The ADC 422 may comprise suitable logic, circuitry, interfaces and/or code that may be operable to convert analog baseband signals received from the VGA 418 of the receiver RF front-end 410 to a corresponding digital baseband signal (e.g., digital samples). The ADC 422 may be operable to sample the received analog baseband signal at an analog-to-digital sampling rate of, for example, 30.72 MHz, which is derived from the reference frequency provided by the frequency control unit 440. The resulting digital baseband signal may comprise values that are representative of the analog baseband signal amplitudes. The digital baseband signal may be communicated with the PSS detector 424 for acquiring correct PSS timing. The digital baseband signal may be communicated with the processor 426 for other baseband processing such as the SSS detection.

The PSS detector 424 may comprise suitable logic, circuitry, interfaces and/or code that may be operable to process the digital baseband signal from the ADC 422 for accurate PSS timing. The PSS detector 424 may be operable to perform a PSS correlation process on the digital baseband signal. The PSS detector 424 may collect energy associated with resulting PSS correlation data in a PSS timing hypothesis buffer. The collected energy may be accumulated for each PSS timing hypothesis in the PSS timing hypothesis buffer.

To avoid a buffer overflow condition, the PSS detector 424 may be configured to monitor the MSB or one of the lesser significant bits of corresponding accumulated energy values during the energy accumulation processes. In instances where a buffer overflow condition occurs, the whole contents of the PSS timing hypothesis buffer may be rescaled by the same number of bits. Specifically, the PSS detector 424 may right shift each of the accumulated energy values in the PSS timing hypothesis buffer by the same number of bits. The PSS detector 424 may be operable to determine or detect the correct PSS timing hypothesis based on the maximum rescaled accumulated energy values within the PSS timing hypothesis buffer. The baseband processor 322 may be operable to utilize the detected correct PSS timing hypothesis to support operations within the receiver 400. For example, the detected correct PSS timing hypothesis may be provided to the frequency control unit 440 to assist frequency control operations.

The processor 426 may comprise suitable logic, circuitry, interfaces and/or code that may be operable to process digital baseband signals from the ADC 422. The processor 426 may be operable to perform various baseband procedures such as channel equalization using the detected correct PSS timing hypothesis from the PSS detector 424.

The memory 428 may comprise suitable logic, circuitry, interfaces and/or code that may enable storage of information such as executable instructions and data that may be utilized by associated device components such as the processor 426 in the receiver 400. The executable instructions may constitute algorithms that may be applied to various baseband procedures such as channel estimation, channel equalization, and/or channel coding. The data may comprise timing and/or frequency offset hypotheses. The memory 428 may comprise RAM, ROM, low latency nonvolatile memory such as flash memory and/or other suitable electronic data storage.

The local oscillator 430 may comprise suitable logic, circuitry, interfaces and/or code that may be operable to provide a mixing signal to the mixer 414 of the receiver 400. The local oscillator 430 may be operable to be adjustable in frequency on the basis of a reference signal provided by the frequency control unit 440.

The frequency control unit 440 may comprise suitable logic, circuitry, interfaces and/or code that may be operable to control the settings for the corresponding reference frequency of the local oscillator 430 and the ADC 422. The frequency control unit 440 may be operable to perform frequency offset estimation according to the detected correct PSS timing hypothesis from the PSS detector 424. The frequency control unit 440 may be operable to adjust the reference frequencies of the local oscillator 430 and the ADC 422, respectively, according to the resulting frequency offset estimates. The operation of the frequency control unit 440 may be operable to control the timing and/or the local oscillator signal frequency of the receiver 400.

In an exemplary operation, the receiver 400 may be operable to receive RF signals from the antenna 310, for example. The received RF signals may comprise successive PSS and SSS transmissions from the base station 110a, for example. The receiver RF front-end 410 may be operable to amplify the received RF signals via the LNA 412 and convert them to baseband signals via the mixer 414 and the LP filter 416, respectively. The baseband signals may be amplified via the VGA 418 and converted to digital baseband signals via the ADC 422. The digital baseband signals may be processed by the PSS detector 424 for acquiring accurate PSS timing. A PSS correlation process may be performed on the digital baseband signals. Energy associated with resulting PSS correlation data may be collected in a PSS timing hypothesis buffer. The PSS detector 424 may be operable to continually accumulate the collected energy for each PSS timing hypothesis in the PSS timing hypothesis buffer. The MSB or one of the lesser significant bits of corresponding accumulated energy values may be observed during the energy accumulation to avoid possible buffer overflow condition. The PSS detector 424 may rescale the whole contents of the PSS timing hypothesis buffer whenever a buffer overflow condition occurs. For example, each of the accumulated energy values in the PSS timing hypothesis buffer may be right shifted by a same number of bits in response to the buffer overflow condition. The correct PSS timing hypothesis for the PSS transmissions may be determined or detected based on the maximum rescaled accumulated energy value within the PSS timing hypothesis buffer. The detected correct PSS timing hypothesis may be utilized by other device components such as the frequency control unit 440 to manage the reference frequencies of the local oscillator 430 and the ADC 422, respectively.

Figure 5:
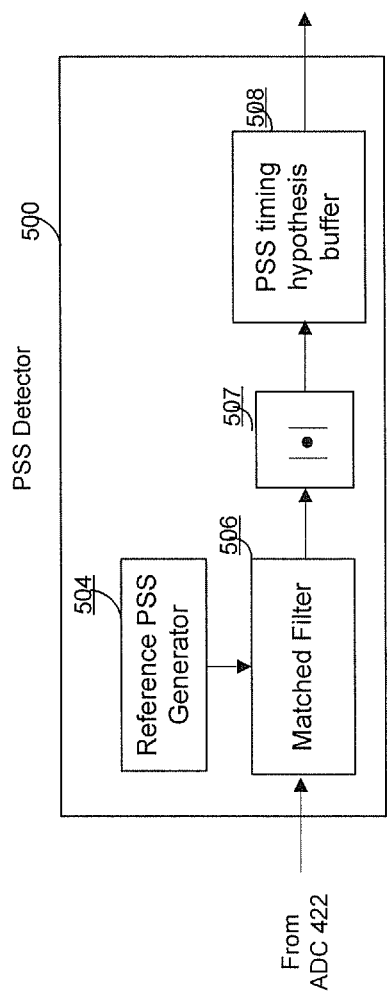
FIG. 5 is a diagram illustrating an exemplary primary synchronization signal (PSS) detector that is operable to automatically rescale an accumulation buffer for acquisition of slot timing, in connection with various embodiments of the invention.

FIG. 5 is a diagram illustrating an exemplary primary synchronization signal (PSS) detector that is operable to automatically rescale an accumulation buffer for acquisition of slot timing, in connection with various embodiments of the invention. Referring to FIG. 5, there is shown a PSS synchronization unit 500. The PSS synchronization unit 500 comprises a reference PSS generator 504, a matched filter 506, a magnitude calculator 507, and a PSS timing hypothesis buffer 508.

The reference PSS generator 504 may comprise suitable logic, circuitry, interfaces and/or code that may be operable to generate a plurality of reference PSSs.

The matched filter 506 may comprise suitable logic, circuitry, interfaces and/or code that may be operable to correlate signals from the ADC 422 with each of a plurality of reference PSSs generated by the reference PSS generator 502. The resulting PSS correlation data may be provided to the magnitude calculator 507 for further processing.

The magnitude calculator 507 may comprise suitable logic, circuitry, interfaces and/or code that may be operable to calculate magnitude values of the PSS correlation data from the matched filter 506. The calculated magnitude values of the PSS correlation data may be provided to the PSS timing hypothesis buffer 508 for further processing.

The PSS timing hypothesis buffer 508 may comprise suitable logic, circuitry, interfaces and/or code that may be operable to collect energy associated with PSS correlation data from the matched filter 506. The PSS timing hypothesis buffer 508 may be configured to accumulate the collected energy for each PSS timing hypothesis for acquisition of a correct PSS timing hypothesis utilized in the cell 110, for example. The PSS timing hypothesis buffer 508 may be configured to monitor or observe the MSB or one of the lesser significant bits of corresponding accumulated energy values during the energy accumulation processes. In instances where a buffer overflow condition occurs, the PSS timing hypothesis buffer 508 may be operable to rescale the accumulated energy values to avoid a possible buffer overflow condition. To maintain the relative scaling among the PSS timing hypotheses, the same number of bits may be utilized to rescale and/or right shift each of the accumulated energy values within the PSS timing hypothesis buffer 508. In this regard, the PSS timing hypothesis buffer 508 may be allowed to perform an energy accumulation process for an arbitrary length of time without causing a buffer overflow and/or loss of PSS detection sensitivity. The correct PSS timing hypothesis and associated slot boundary may be detected based on the maximum rescaled accumulated energy values within the PSS timing hypothesis buffer 508. The detected correct PSS timing hypothesis and associated slot boundary may be utilized by a mobile device such as the mobile device 118 to start camping on a corresponding cell such as the cell 110.

In an exemplary operation, a digital baseband signal may be received from the ADC 422. The received digital baseband signal comprises a PSS transmitted from the base station 110, for example. The received digital baseband signal may be correlated with a plurality of reference PSSs provided by the reference PSS generator 504 to acquire a correct PSS timing hypothesis from the base station 110*a*. Magnitudes of PSS correlation data may be calculated via the magnitude calculator 507 and provided to the PSS timing hypothesis buffer 508. The collected energy for each PSS timing hypothesis may be accumulated within the PSS timing hypothesis buffer 508 utilizing, for example, integrating or filtering methods. The MSB or one or the lesser significant bits of corresponding accumulated energy values in the PSS timing hypothesis buffer 508 may be monitored during the energy accumulation processes to avoid a buffer overflow condition. In instances where the MSB or one of the lesser significant bits of at least one accumulated energy value is close to the maximum numerical range of the buffer, an indication of a buffer overflow condition maybe generated. The accumulated energy values for each possible PSS timing hypothesis may be rescaled in instances when a buffer overflow signal is generated or a buffer overflow occurs. To maintain the relative scaling among the PSS timing hypotheses, the PSS timing hypothesis buffer 508 may right shift each of the accumulated energy values within the PSS timing hypothesis buffer 508 by a same number of bits. The correct PSS timing hypothesis and associated slot boundary may be determined or detected based on the maximum rescaled accumulated energy value within the PSS timing hypothesis buffer 508. The PSS timing hypothesis buffer 508 may be operable to provide the detected correct PSS timing hypothesis and associated slot to assist a corresponding mobile device such as the mobile device 118 to start camping on a corresponding cell such as the cell 110.

Figure 6:
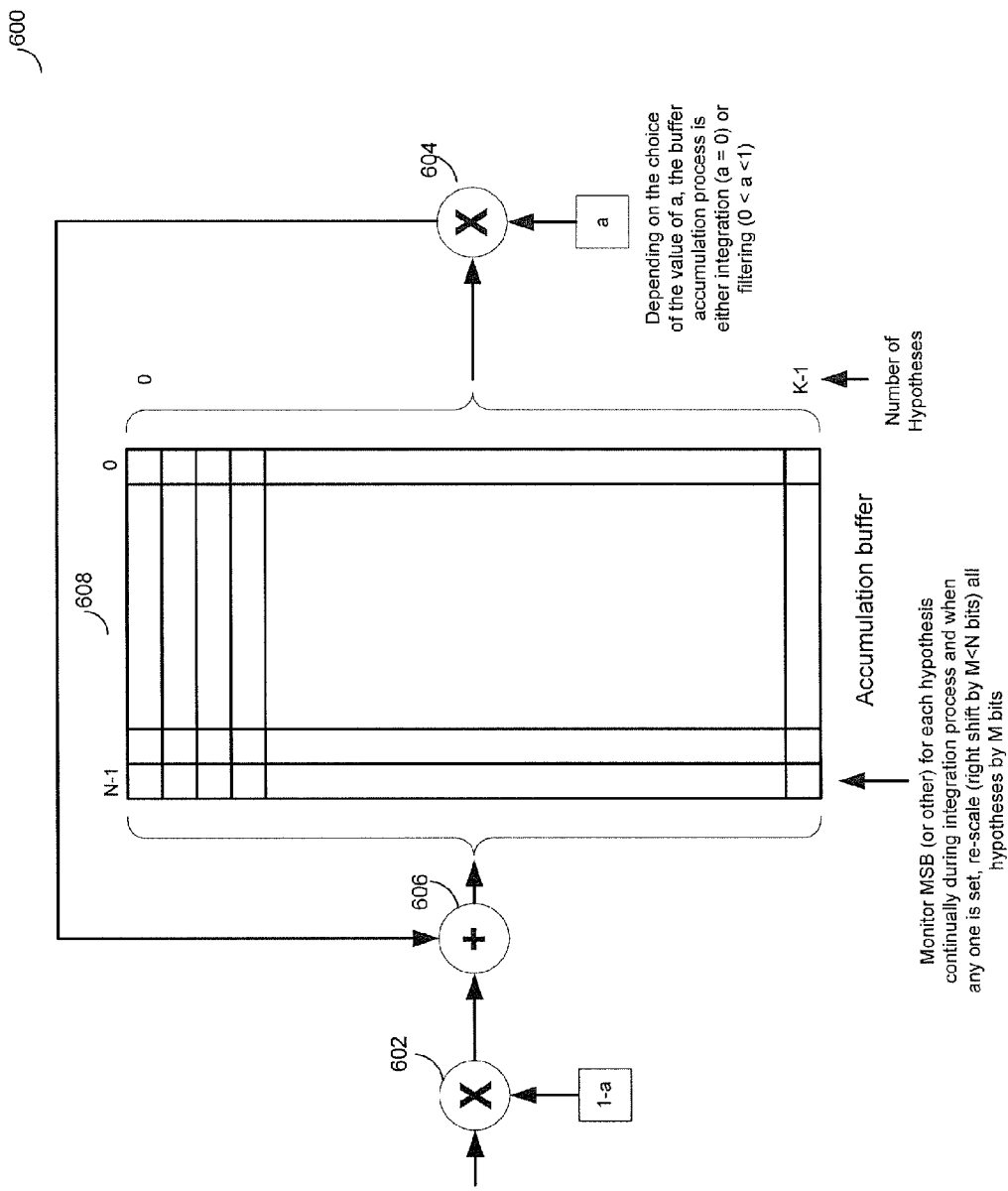
FIG. 6 is a diagram illustrating an exemplary automatic rescaling of a PSS timing hypothesis buffer for acquisition of slot timing, in connection with various embodiments of the invention.

FIG. 6 is a diagram illustrating an exemplary automatic rescaling of a PSS timing hypothesis buffer for acquisition of slot timing, in connection with various embodiments of the invention. Referring to FIG. 6, there a shown a PSS timing hypothesis buffer 600 comprising a multiplier 602-604, an adder 606, and an accumulation buffer 608.

The multipliers 602-604 may comprise suitable logic, circuitry, interfaces and/or code that may be operable to scale the PSS timing hypothesis buffer 608 with buffer mode parameters a and 1−a, where 0≤a<1. In instances where a=0, an integrating method may be utilized to accumulate energy associated with PSS transmissions. In instances where 0<a<1, a filtering method may be utilized to accumulate energy associated with PSS transmissions. The adder 606 may comprise suitable logic, circuitry, interfaces and/or code that may be operable to add signals from the multipliers 602-604. The accumulation buffer 608 may comprise suitable logic, circuitry, interfaces and/or code that may be operable to store accumulated energy values for each possible PSS timing hypothesis. As shown in FIG. 6, the accumulation buffer 608 comprises K PSS timing hypotheses, where K is a positive integer. The accumulation buffer 608 has a length of N (bits), where N is a positive integer. To avoid buffer overflow condition, the MSB or one of the lesser significant bits of accumulated energy values may be monitored for each possible PSS timing hypothesis. The K PSS timing hypotheses may be rescaled, namely, right shifted, by M<N bits.

Figure 7:
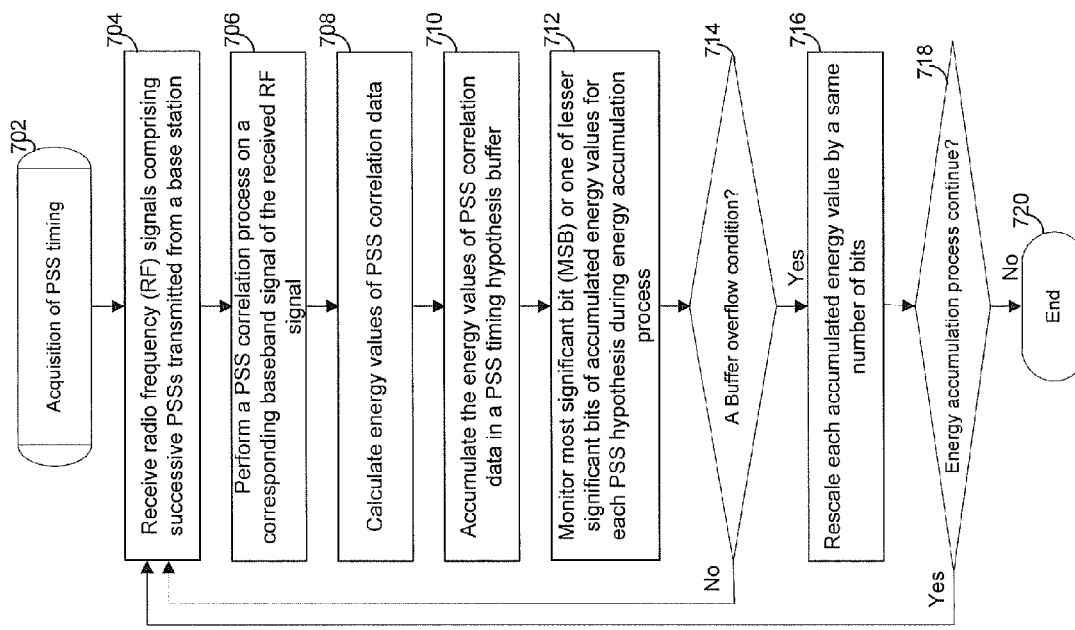
FIG. 7 is a diagram illustrating exemplary steps utilized by a receiver to automatically rescale a primary synchronization signal (PSS) timing hypothesis accumulation buffer for acquisition of slot timing, in accordance with an embodiment of the invention.

FIG. 7 is a diagram illustrating exemplary steps utilized by a receiver to automatically rescale a primary synchronization signal (PSS) timing hypothesis accumulation buffer for acquisition of slot timing, in accordance with an embodiment of the invention. The exemplary steps may start with the step 702. In step 702, a mobile device such as the mobile device 118 is in a state to acquire PSS timing to enable communication with the base station 110*a*. In step 704, the mobile device 118 may receive RF signals from the base station 110*a*. The received RF signals may comprise successive PSS transmissions from the base station 110*a*. The received RF signals may be processed and converted to corresponding digital baseband signals via the receiver RF front-end 410 and the ADC 422, respectively. In step 706, the PSS detector 500 may be operable to perform a PSS correlation process via the matched filter 506 on the digital baseband signals from the ADC 422. In step 708, the magnitude calculator 507 may be operable to calculate energy values (magnitudes) of PSS correlation data from the matched filter 506. In step 710, the calculated energy values of the PSS correlation data may be accumulated in the PSS timing hypothesis buffer 508 for each possible PSS timing hypothesis. In step 712, the most significant bit (MSB) or one of lesser significant bits of accumulated energy values for each PSS timing hypothesis may be monitored during the energy accumulation process within the accumulation buffer 608. In step 714, it may be determined whether a buffer overflow has occurred. In instances where a buffer overflow occurs, then in step 716, the PSS timing hypothesis buffer 508 may be configured to rescale each accumulated energy value by M bits, where M is pre-determined and M<N, N is the length of the accumulation buffer 608. In step 718, it may be determined whether the energy accumulation process may continue. In instances where the energy accumulation process should continue, then the exemplary steps may return to the step 704.

In step 714, in instances where a buffer over flow condition does not occur, then the exemplary steps may return to the step 704. In step 718, in instances where the energy accumulation process may not need to continue, then the exemplary steps may end in the step 720.

In various exemplary aspects of the method and system for automatically rescaling an accumulation buffer in synchronization systems, a mobile device such as the mobile device 114 may be operable to receive radio frequency (RF) signals from the base station 110*a*. The received signals may comprise successive PSS and SSS transmissions as shown in FIG. 2. The received PSS and SSS transmissions may be used by the mobile device 114 to acquire cell-specific parameters via the PSS synchronization and the SSS detection, respectively. In this regard, the mobile device 114 may be operable to accumulate energy associated with each of the received PSS transmissions in the PSS timing hypothesis buffer 508. The accumulated energy values may be rescaled by a same number of bits whenever a buffer overflow condition occurs in the PSS timing hypothesis buffer 508. The PSS detector 500 may be operable to detect a correct PSS timing hypothesis utilizing the rescaled accumulated energy values within the PSS timing hypothesis buffer 508. A significant bit such as, for example, the MSB or one of lesser significant bits, of each of the accumulated energy values may be monitored or observed during the energy accumulation process. A buffer overflow condition may be identified or detected based on the corresponding monitored significant bit for the accumulated energy values, and the actual configuration of the PSS timing hypothesis buffer 508. In instances where a buffer overflow condition occurs, the PSS detector 500 may be operable to determine the number of bits utilized for rescaling or right shifting each of the accumulated energy values. The resulting shifted accumulated energy values may be utilized for PSS detection. Depending on system configuration, various accumulation approaches such as, for example, integrating or filtering methods, may be utilized during the energy accumulation process.

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for automatically rescaling an accumulation buffer in synchronization systems.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for communication in a mobile device including an accumulation buffer, the method comprising:
    correlating, by the mobile device, a plurality of reference sequences with a plurality of primary synchronization signal (PSS) transmissions to provide a plurality of PSS timing hypotheses;
    accumulating, in the accumulation buffer, values representative of energy associated with the plurality of PSS timing hypotheses to provide accumulated energy values;
    rescaling the accumulated energy values by a rescaling factor when a particular PSS timing hypothesis from among the plurality of PSS timing hypotheses is at risk of saturating the accumulation buffer; and
    detecting a correct PSS timing hypothesis from among the plurality of PSS timing hypotheses based on the rescaled accumulated energy values.

2. The method according to claim 1, further comprising:
monitoring a significant bit of each of the accumulated energy values.

3. The method according to claim 2, wherein the significant bit is a most significant bit or one of lesser significant bits.

4. The method according to claim 2, further comprising:
detecting the saturation of the accumulation buffer based on said monitoring.

5. The method according to claim 4, further comprising:
determining the rescaling factor in response to the detected saturation of the accumulation buffer.

6. The method according to claim 5, wherein the rescaling comprises:
right shifting the accumulated energy values by the rescaling factor to provide right shifted accumulated energy values as the rescaled accumulated energy values.

7. The method according to claim 1, wherein the accumulating comprises:
accumulating the values utilizing an integrating method to provide the accumulated energy values.

8. The method according to claim 1, wherein the accumulating comprises:
accumulating the values utilizing a filtering method to provide the accumulated energy values.

9. The method according to claim 1, wherein the resealing comprises:
resealing the accumulated energy values prior to the saturating of the accumulation buffer.

10. The method according to claim 1, wherein a bit length of the resealing factor is less than a bit length of the accumulation buffer.

11. The method according to claim 1, wherein the accumulating comprises:
accumulating the values for an arbitrary length of time.

12. The method according to claim 1, further comprising;
monitoring significant bits of the accumulated energy values to determine when the particular PSS timing hypothesis is at risk of saturation; and
adjusting the resealing factor based on the monitoring.

13. A baseband processor for a mobile device, the baseband processor comprising:
an accumulation buffer configured to accumulate values representative of energy associated with a plurality of primary synchronization signal (PSS) timing hypotheses to provide accumulated energy values,
wherein the baseband processor is configured:
to correlate a plurality of reference sequences with a plurality of PSS transmissions to provide the plurality of PSS timing hypotheses;
to rescale the accumulated energy values by a resealing factor when a particular PSS timing hypothesis from among the plurality of PSS timing hypotheses is at risk of saturating the accumulation buffer; and
to detect a correct PSS timing hypothesis from among the plurality of PSS timing hypotheses based on the rescaled accumulated energy values.

14. The baseband processor according to claim 13, wherein the baseband processor is further configured to monitor a significant bit of each of the values.

15. The baseband processor according to claim 14, wherein the significant bit is a. most significant bit or one of lesser significant bits.

16. The baseband processor according to claim 14, wherein the baseband processor is further configured to detect the saturating of the accumulation buffer based on the monitoring.

17. The baseband processor according to claim 16, wherein the baseband processor is further configured to determine the resealing factor in response to the detected saturation of the accumulation buffer.

18. The baseband processor according to claim 17, wherein the baseband processor is further configured to right shift each of the accumulated energy values by the resealing factor to provide right shifted accumulated energy values as the resealed accumulated energy values.

19. The noseband processor according to claim 13, wherein the baseband processor is further configured to utilize an integrating method to accumulate the values to provide the accumulated energy values.

20. The baseband processor according to claim 13, wherein the baseband processor is further configured to utilize a filtering method to accumulate the values to provide the accumulated energy values.

21. The baseband processor according to claim 13, wherein the baseband processor is further configured to rescale the accumulated energy values prior to the saturating of the accumulation buffer.

22. The baseband processor according to claim 13, wherein a bit length of the resealing factor is less than a hit length of the accumulation buffer.

23. The baseband processor according to claim 13, wherein the baseband processor is configured to accumulate the values for an arbitrary length of time.

24. The baseband processor according to claim 13, wherein the baseband processor is configured to:
monitor significant bits of the accumulated energy values to determine when the particular PSS timing hypothesis is at risk of saturation; and
adjust the resealing factor based on the monitoring.

* * * * *

UNITED STATES PATENT AND TRADEMARK OFFICE
CERTIFICATE OF CORRECTION

PATENT NO. : 8,917,704 B2  Page 1 of 1
APPLICATION NO. : 12/768415
DATED : December 23, 2014
INVENTOR(S) : Swarts et al.

It is certified that error appears in the above-identified patent and that said Letters Patent is hereby corrected as shown below:

In the Claims

Column 15, line 25, please replace, "the resealing" with --the rescaling--.

Column 15, line 27, please replace, "resealing the" with --rescaling the--.

Column 15, line 30, please replace, "the resealing" with --the rescaling--.

Column 15, line 39, please replace, "the resealing" with --the rescaling--.

Column 15, line 50, please replace, "a resealing" with --a rescaling--.

Column 16, line 11, please replace, "is a. most" with --is a most--.

Column 16, lines 18-19, please replace, "the resealing" with --the rescaling--.

Column 16, line 23, please replace, "the resealing" with --the rescaling--.

Column 16, line 24-25, please replace, "the resealed" with --the rescaled--.

Column 16, line 39, please replace, "the resealing" with --the rescaling--.

Column 16, line 50, please replace, "the resealing" with --the rescaling--.

Signed and Sealed this
Seventh Day of April, 2015

Michelle K. Lee
*Director of the United States Patent and Trademark Office*